(12) United States Patent
Yamamoto et al.

(10) Patent No.: US 8,593,730 B2
(45) Date of Patent: Nov. 26, 2013

(54) STAGE CONTROL DEVICE, STAGE CONTROL METHOD AND MICROSCOPE

(75) Inventors: Takashi Yamamoto, Tokyo (JP); Yu Hirono, Tokyo (JP); Fumiyasu Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 13/075,672

(22) Filed: Mar. 30, 2011

(65) Prior Publication Data

US 2011/0249327 A1   Oct. 13, 2011

(30) Foreign Application Priority Data

Apr. 7, 2010  (JP) ................... P2010-088939

(51) Int. Cl.
  *G02B 21/26*    (2006.01)
(52) U.S. Cl.
  USPC .......................................... 359/391
(58) Field of Classification Search
  USPC ................................... 359/391–395
  See application file for complete search history.

(56) References Cited

U.S. PATENT DOCUMENTS

| | | | |
|---|---|---|---|
| 4,367,915 A * | 1/1983 | Georges ................... | 359/385 |
| 4,807,984 A * | 2/1989 | Kurimura et al. ........... | 359/393 |
| 5,646,776 A * | 7/1997 | Bacchi et al. ............... | 359/393 |
| 5,888,042 A * | 3/1999 | Oda .................... | 414/222.07 |
| 5,900,708 A * | 5/1999 | Den Engelse et al. ........ | 318/640 |
| 6,847,481 B1 * | 1/2005 | Ludl et al. .................. | 359/391 |
| 7,403,330 B2 * | 7/2008 | Henderson et al. ........... | 359/391 |
| 7,426,345 B2 * | 9/2008 | Takamatsu et al. ........... | 396/432 |
| 7,948,676 B2 * | 5/2011 | Virag et al. ................. | 359/391 |
| 8,149,505 B2 * | 4/2012 | Fischer et al. ............... | 359/391 |
| 2004/0240050 A1 * | 12/2004 | Ogihara .................... | 359/382 |

FOREIGN PATENT DOCUMENTS

JP    2003-222801    8/2003
JP    2011-089932    5/2011

* cited by examiner

*Primary Examiner* — Mark Consilvio
(74) *Attorney, Agent, or Firm* — K&L Gates LLP

(57) ABSTRACT

A stage control device including a position detection portion which detects a position deviation of a support plate relative to a reference position regulated by a convex portion provided in a stage, from an image of a scope including the support plate on which a sample is disposed and which is mounted on the stage; and a stage control portion that presses the stage, which is moved and controlled in a surface direction of the support plate so that the sample is in an imaging scope of an imaging element, from a position of a detection point in time in a direction corresponding to a position deviation at a pressing speed, and returns the stage up to a position of the detection point in time at a return speed slower than the pressing speed, when the position deviation of the support plate relative to the reference position is detected.

11 Claims, 11 Drawing Sheets

STAGE CONTROL DEVICE, STAGE CONTROL METHOD AND MICROSCOPE

CROSS REFERENCES TO RELATED APPLICATIONS

The present application claims priority to Japanese Priority Patent Application JP 2010-088939 filed in the Japan Patent Office on Apr. 7, 2010, the entire contents of which are hereby incorporated by reference.

BACKGROUND

The present application relates to a stage control device, a stage control method and a microscope, and is suitable for being applied to, for example, a field of observing a biological sample.

The biological sample is maintained after a tissue slice or the like subjected to dyeing as necessary is processed to an examinable state and is fixed to a preparation slide. Generally, when a maintenance period is extended, visibility in the microscope relative to the biological sample deteriorates due to deterioration, discoloration or the like of the tissue slice. Furthermore, the biological sample is also diagnosed in facilities other than the hospital where the sample is created or the like, the sending and the receiving of the biological sample is generally performed by post and a fixed time is necessary.

In view of the circumstances and the like, a device is suggested which images and preserves the biological sample as image data (for example, Japanese Unexamined Patent Application Publication No. 2003-222801).

In such a device, a biological sample image acquisition system is suggested which sequentially loads a plurality of preparation slides, which is stored in a cartridge provided outside the microscope, in the microscope and performs the imaging (for example, Japanese Patent Application No. 2009-244736).

In the biological sample image acquisition system, an arm automatically mounts the preparation slide of the imaging target from the cartridge on a stage of the microscope, and when the imaging is completed, the arm accommodates the preparation slide from the stage in the cartridge again.

SUMMARY

Incidentally, since a glass slide and a cover glass of a support plate such as the preparation slide supporting the biological sample differ in size, a thickness of the biological sample, a thickness and an excessive amount of an embedding agent, an adhesion position, a size and an excessive amount of a label or the like, there are so may uncertain elements.

In a case where such a support plate is automatically loaded on the stage, for example, the arm mounts the support plate on the stage in a state in which the adhesion surface of the label is in contact with the arm, thereby mounting the support plate in a position deviated from a predetermined reference position in the stage.

When the support plate deviates from the reference position, generally, the biological sample image acquisition system judges that a load error of the support plate has occurred and stops the motion of the automatic imaging.

In such a case, since it is difficult to perform the imaging of the biological sample in the support plate after that, the biological sample image acquisition system reports the occurrence of the loading error, and it is necessary for a worker to load the support plate on the microscope again.

Furthermore, there is a problem in that, for example, in a case where the automatic imaging is started at night and the result thereof is ascertained the next morning, a worker who realizes the occurrence of the imaging error the next morning has to restart the automatic imaging after that, whereby the automatic imaging of the biological sample becomes extremely inefficient.

It is desirable to suggest a stage control device, a stage control method, and a microscope that can specially and effectively image the sample.

According to an embodiment, there is provided a stage control device including a position detection portion which detects a position deviation of a support plate relative to a reference position to be regulated by a convex portion provided in a stage, from an image of a scope including the support plate on which a sample is disposed and which is mounted on the stage; and a stage control portion that presses the stage, which is moved and controlled in a surface direction of the support plate so that the sample is in an imaging scope of an imaging element, from a position of a detection point in time in a direction corresponding to a position deviation at a pressing speed, and returns the stage up to a position of the detection point in time at a return speed slower than the pressing speed, when the position deviation of the support plate relative to the reference position is detected.

In the stage control device, when the support plate is mounted so as to be deviated from the reference position in the stage, by moving the support plate so as to slide an upper portion of the convex portion, the support plate can approach the reference position.

Furthermore, according to another embodiment, there is provided a stage control method including the steps of detecting a position deviation of a support plate relative to a reference position to be regulated by a convex portion provided in a stage, from an image of a scope including the support plate on which a sample is disposed and which is mounted on the stage; and pressing the stage, which is moved and controlled in a surface direction of the support plate so that the sample is in an imaging scope of an imaging element, from a position of a detection point in time in a direction corresponding to a position deviation at a pressing speed, and returning the stage up to a position of the detection point in time at a return speed slower than the pressing speed, when the position deviation of the support plate relative to the reference position is detected.

In the stage control method, when the support plate is mounted so as to be deviated from the reference position in the stage, by moving the support plate so as to slide an upper portion of the convex portion, the support plate can approach the reference position.

Furthermore, according to still another embodiment, there is provided a microscope including a stage on which the support plate with a sample disposed thereon is mounted and which is moved and controlled in a surface direction of the support plate so that the sample is in an imaging scope of an imaging element; a convex portion which is provided in the stage and regulates the support plate in a reference position in the stage; a position detection portion which detects a position deviation of the support plate relative to the reference position from an image of a scope including the support plate; and a stage control portion which presses the stage in a direction corresponding to a position deviation from a position of a detection point in time at a pressing speed, and returns the stage up to a position of the detection point in time at a return speed slower than the pressing speed, when the position deviation of the support plate relative to the reference position is detected.

In the microscope, when the support plate is mounted so as to be deviated from the reference position in the stage, by moving the support plate so as to slide an upper portion of the convex portion, the support plate can approach the reference position.

According to the embodiment, it is possible to realize a stage control device, a stage control method, and a microscope in which, when the support plate is mounted so as to be deviated from the reference position in the stage, by moving the support plate so as to slide an upper portion of the convex portion, the support plate can approach the reference position, which can specially and effectively image the sample.

Additional features and advantages are described herein, and will be apparent from the following Detailed Description and the figures.

DETAILED DESCRIPTION

Embodiments of the present application will be described below in detail with reference to the drawings.

Figure 1:
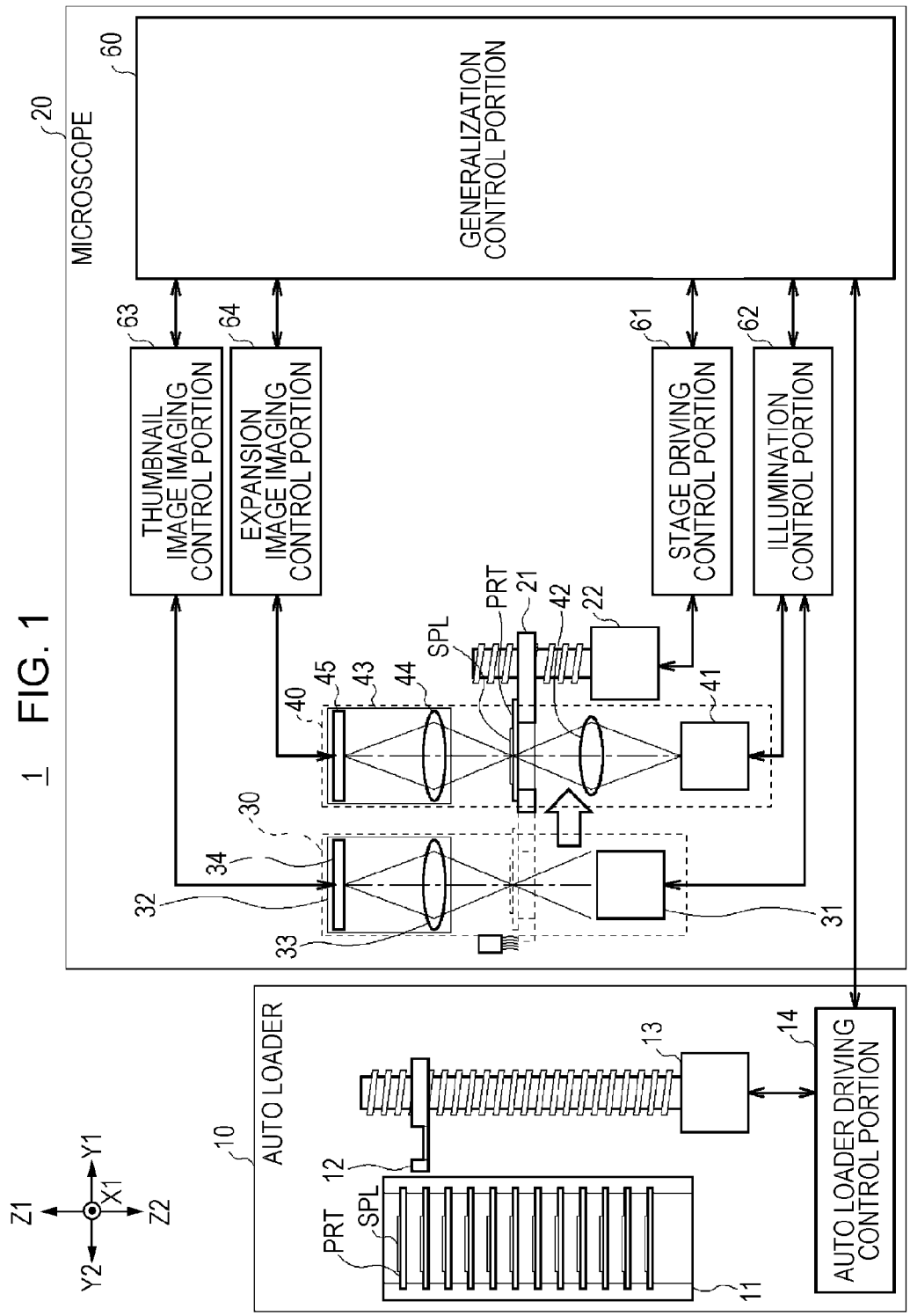
FIG. 1 is schematic diagram showing a configuration of a biological sample image acquisition system according to an embodiment.

Hereinafter, embodiments for carrying out the present application (hereinafter, called embodiment) will be described. Furthermore, the description will be performed in the following order:

1. Embodiment
2. Other Embodiment
1. Embodiment
1-1. Configuration of Biological Sample Image Acquisition System FIG. 1 shows a biological sample image acquisition system 1 according to an embodiment. The biological sample image acquisition system 1 includes an auto loader 10 and a microscope 20.

The biological sample image acquisition system 1 is adapted to sequentially transport and load a plurality of preparation slides PRT stored in the auto loader 10 to the microscope 20 one by one based on the control of a generalization control portion 60 provided in the microscope 20. Furthermore, the biological sample image acquisition system 1 is adapted to automatically image a biological sample SPL disposed on the loaded preparation slide PRT by the microscope 20 and preserve the acquired image.

1-2. Configuration of Auto Loader

In the auto loader 10, a preparation slide cartridge 11 with the plurality of preparation slides PRT stored therein is provided. Furthermore, an arm 12, which grasps the preparation slide PRT, is provided near the preparation slide cartridge 11, the arm 12 can be moved in an up and down (a Z axis direction) by an arm driving mechanism 13.

Practically, an auto loader driving control portion 14 provided in the auto loader 10 drives the arm driving mechanism 13 on the basis of the control of the generalization control portion 60 provided in the microscope 20. As a result, the arm 12 supports a desired preparation slide PRT including a biological sample SPL to be imaged from a lower surface, and mounts the same onto the stage 21 provided in the microscope 20.

Furthermore, when the preparation slide PRT with the biological sample SPL, in which the imaging is finished, disposed thereon is supplied from the microscope 20, the auto loader 10 distinguishes the same from the preparation slide PRT with the biological sample SPL, in which the imaging is not performed yet, disposed thereon, and houses the same in the preparation slide cartridge 11.

Herein, the preparation slide PRT is constituted so that the biological sample SPL formed of the tissue slice is fixed by the embedding agent and is interposed by a glass slide and a cover glass. Furthermore, the biological sample SPL is dyed by a predetermined dyeing method as necessary.

Figure 5A:
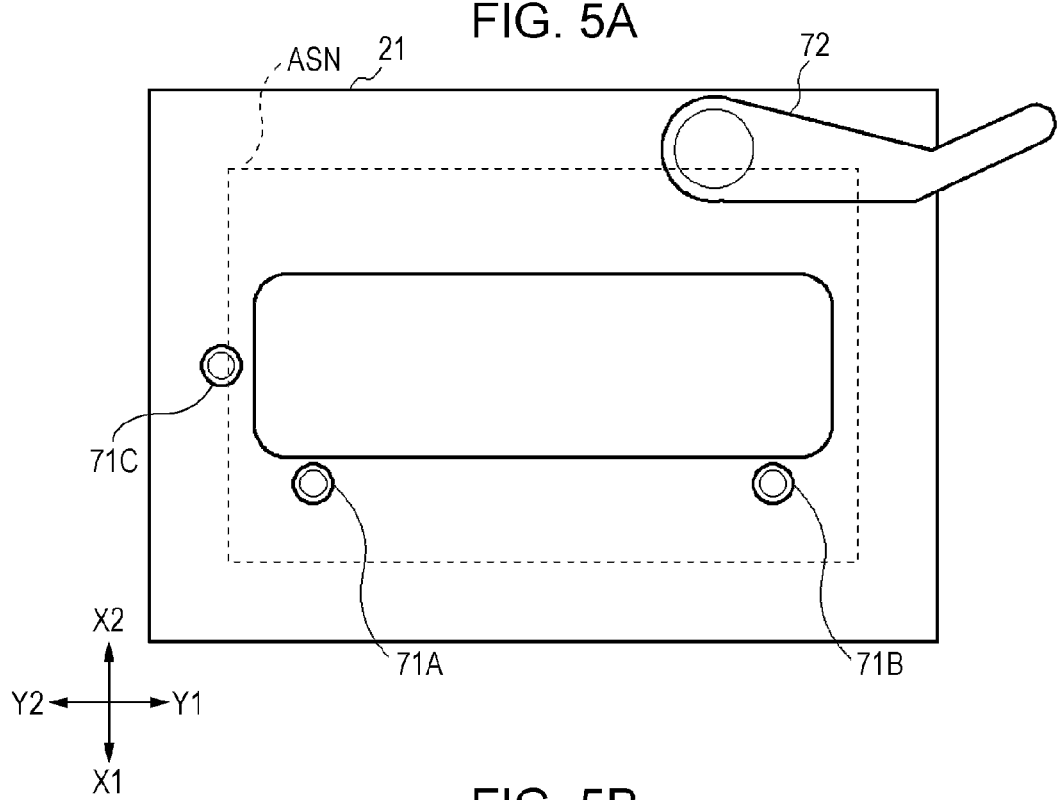
FIGS. 5A and 5B are schematic diagrams showing state (1) of a stage.
Figure 5B:
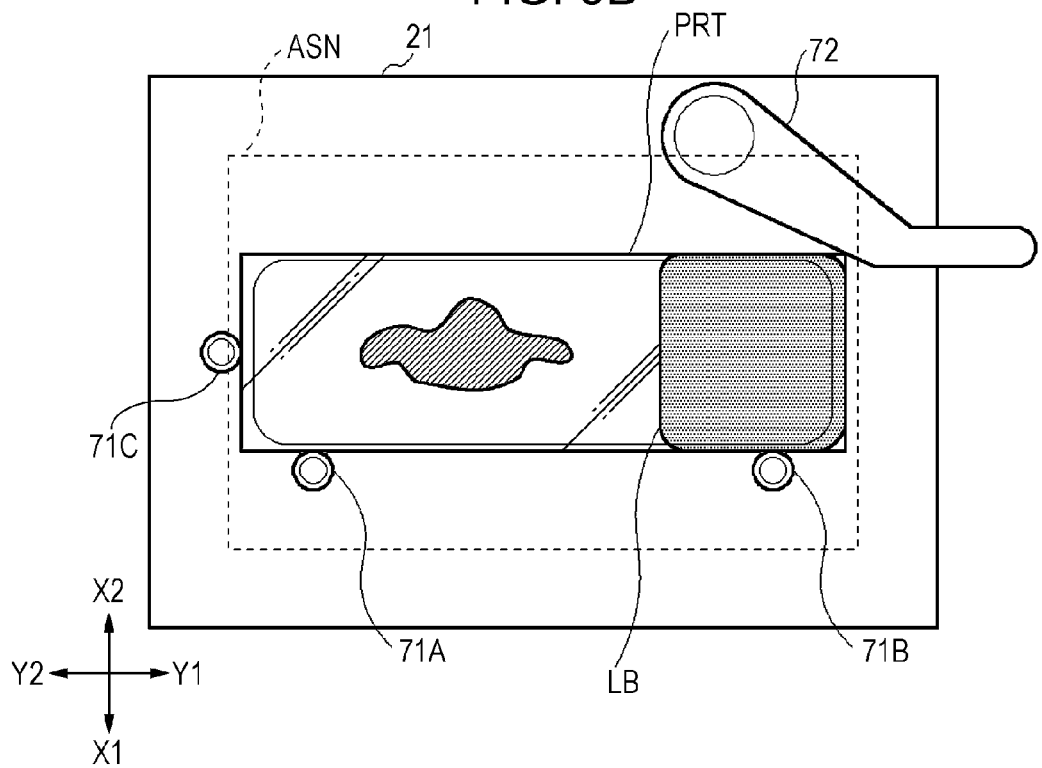

As shown in FIG. 5B, generally, a label LB of a paper, on which information on the biological sample SPL is written, is attached onto an upper surface of the cover glass.

1-3. Configuration of Microscope

The microscope 20 includes a thumbnail image imaging portion 30 that images a thumbnail image which is the whole image of the preparation slide PRT with the biological sample SPL disposed thereon, and an expansion image imaging portion 40 that images an expansion image of the biological sample SPL.

In the microscope 20, a stage 21 having an opening portion smaller than the preparation slide PRT is provided, and the preparation slide PRT is disposed on the opening portion. Furthermore, in the microscope 20, a stage driving mechanism 22 is provided with respect to the stage 21. Hereinafter, a surface on which the preparation slide PRT is disposed in the stage 21 will be called a preparation slide disposition surface.

The stage driving mechanism 22 drives the stage 21 in a direction (a Z axis direction) perpendicular to a direction (an X-Y axis direction) parallel to the stage surface.

Figure 2:
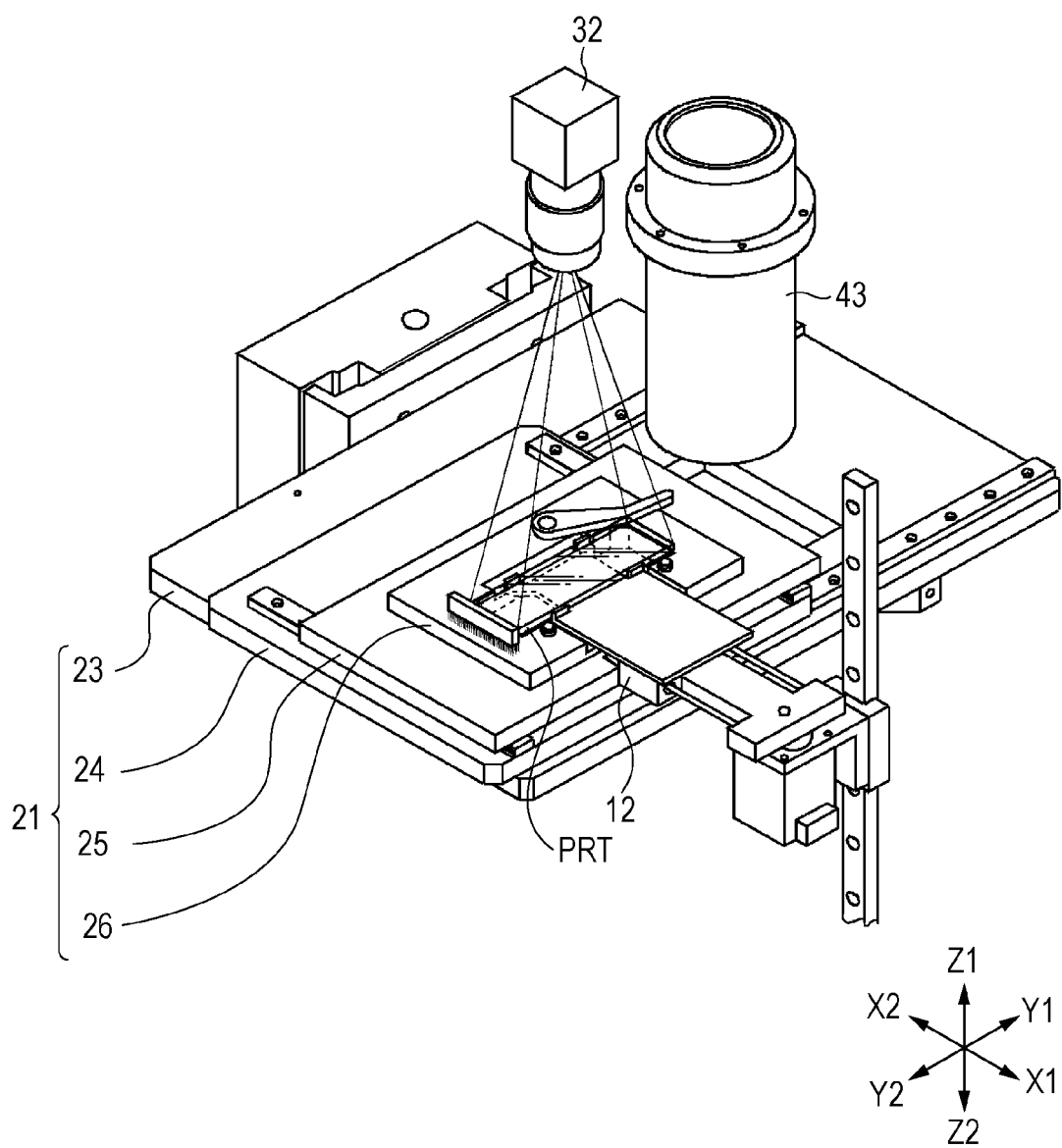
FIG. 2 is a schematic diagram showing configuration (1) of a stage.

As shown in FIG. 2, the stage 21 includes a Y moving table 24 which is provided movably with respect to a support table 23 fixed to the microscope 20 in a Y axis direction, an X moving table 25 which is provided movably on the upper surface of the Y moving table 24 in an X axis direction, and a mounting table 26 which is fixed to the upper surface of the X moving table 25 and on which the preparation slide PRT is mounted.

In the thumbnail image imaging portion 30 (FIG. 1), a thumbnail image illumination light source 31 is provided at a surface side opposite to the preparation slide disposition surface of the stage 21.

The thumbnail illumination light source 31 can irradiate light (hereinafter, also referred to as a bright-field illumination light) which illuminates the biological sample SPL subjected to a general dyeing and light (hereinafter, also referred to as a dark-field illumination light) which illuminates the biological sample SPL subjected to a special dyeing in a switch-over manner. However, the thumbnail image illumination light source 31 may be able to irradiate only any one of the bright-field illumination light or the dark-field illumination light. In addition, in the thumbnail image imaging portion 30, a label light source (not shown), which irradiates a label LB adhered to the preparation slide PRT with light, is separately provided.

At a side just above the preparation slide disposition surface side of the stage 21, a thumbnail camera 32 is provided. In the thumbnail camera 32, an objective lens 33 of a predetermined magnification is provided which sets a normal of the preset reference position, on which the preparation slide PRT is mounted on the stage surface, as an optical axis. A thumbnail image imaging element 34, which forms an image collected by the objective lens 33, is disposed above the objective lens 33.

Meanwhile, in the expansion image imaging portion 40, at a surface side opposite to the preparation slide disposition surface of the stage 21, an expansion image illumination light source 41 which irradiates the bright-field illumination light is disposed. Furthermore, at a position (e.g., the preparation slide disposition surface side) different from the expansion image illumination light source 41, a light source (not shown) which irradiates the dark-field illumination light is disposed.

Between the expansion image illumination light source 41 and stage 21, a condenser lens 42 is disposed which sets a normal of the reference position in the preparation slide disposition surface as an optical axis.

An expansion image camera 43 is disposed above the preparation slide disposition surface side of the stage 21, and in the expansion image camera 43, an objective lens 44 of a predetermined magnification is disposed which sets a normal of the reference position in the stage surface as an optical axis. An expansion image imaging element 45, on which the image expanded by the objective lens 44 is formed, is disposed above the objective lens 44.

A stage driving control portion 61 is connected to the stage driving mechanism 22 as a control system in the microscope 20, an illumination control portion 62 is connected to the thumbnail image illumination light source 31 and the expansion image illumination light source 41, a thumbnail image imaging control portion 63 is connected to the thumbnail image imaging element 34, and an expansion image imaging control portion 64 is connected to the expansion image imaging element 45, respectively via data communication paths.

These control systems are computers which include a CPU (Central Processing Unit), a ROM (Read Only Memory), a RAM (Random Access Memory) becoming a work memory of the CPU, an operational circuit or the like.

The stage driving control portion 61 drives and controls the stage driving mechanism 22, and when acquiring the thumbnail image, the stage driving control portion 61 moves the stage 21 in the stage surface direction (X axis-Y axis direction) so that the biological sample SPL is situated in the thumbnail image imaging position which is a position where the normal of the reference position of the stage 21 becomes the optical axis of the objective lens 32 between the thumbnail image illumination light source 31 and the objective lens 33. Furthermore, the stage driving control portion 61 moves the stage 21 in the Z axis direction so that the focus of the objective lens 33 is matched with the preparation slide PRT.

The illumination control portion 62 sets the parameter depending on a mode (hereinafter, also referred to as a bright-field mode) to acquire the bright-field image or a mode (hereinafter, also referred to as a dark-field mode) to acquire the dark-field image, in the thumbnail image illumination light source 31, thereby irradiating the illumination light from the thumbnail image illumination light source 31.

When the illumination light is irradiated from the thumbnail image illumination light source 31, the illumination light is irradiated with the whole biological sample SPL via the opening portion of the stage 21.

The thumbnail image imaging control portion 63 sets the parameter depending on the bright-field mode or the dark-field mode in the thumbnail image imaging element 34, and acquires the data of the thumbnail image including the whole the preparation slide PRT formed on the imaging surface of the thumbnail image imaging element 34.

Figure 7:
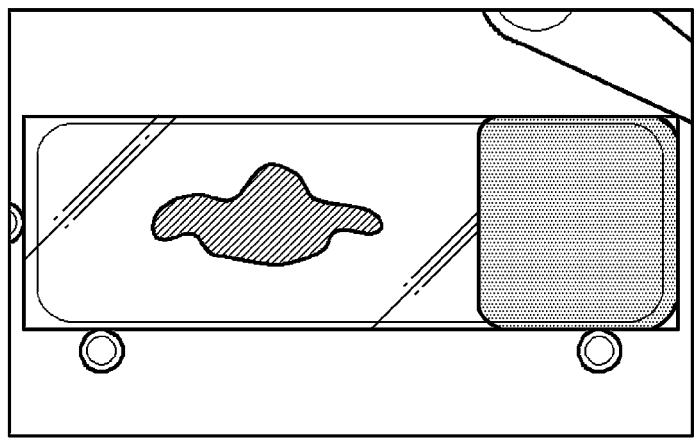
FIG. 7 is a schematic diagram showing a thumbnail image after loading.

Actually, for example, as shown in FIG. 5B, when the preparation slide PRT is mounted on the stage 21, the thumbnail image imaging control portion 63 acquires the data of the thumbnail image shown in FIG. 7 which is an image in a thumbnail image imaging scope ASN.

Herein, the thumbnail image imaging scope ASN is a rectangular-shaped scope which includes the whole preparation slide PRT with the biological sample SPL disposed thereon.

As a result, the microscope 20 can preserve the thumbnail image of the whole preparation slide PRT including the label LB, and thus can recognize the description content of the label LB. Furthermore, since a mark, a symbol or the like written by a doctor or the like with an oil-based pen can also be recorded on the preparation slide PRT at the same time, it is possible to easily distinguish them as a target when a doctor or the like performs the retrieving using the thumbnail image.

The thumbnail image imaging control portion 63 calculates the position of the biological sample SPL relative to the stage 21 from a relationship between a pixel position of a region of the pixel showing the biological sample SPL extracted from the acquired thumbnail image, for example, based on the luminance value and a coordinate position of the stage 21 when the thumbnail image is imaged.

The generalization control portion 60 allocates the imaging scope of the expansion image to the biological sample SPL based on the position of the biological sample SPL relative to the calculated stage 21. The imaging scope can be allocated so that all the biological samples SPL are included in some image scope and the number of the imaging scope becomes the minimum.

In this manner, since the microscope 20 calculates the position of the biological sample SPL relative to the stage 21 based on the thumbnail image, it is possible to improve the imaging efficiency without imaging the expansion image of the region where the biological sample SPL is not disposed in the preparation slide PRT.

Moreover, the microscope 20 enables a doctor or the like to recognize the whole image of the biological sample SPL corresponding to the expansion image by imaging the thumbnail image which is the whole image of the preparation slide PRT including the label LB and preserving it to correspond to the expansion image, which makes it possible to easily facilitate the management of the data of the expansion image.

Meanwhile, the stage driving control portion 61 (FIG. 1) drives and controls the stage driving mechanism 22, and when acquiring the expansion image, moves the stage 21 in a stage surface direction (X axis-Y axis direction) so that the biological sample SPL is situated in the expansion image imaging position which is a position where the normal of the reference position of the stage 21 becomes the optical axis of the condenser lens 42 between the condenser lens 42 and the objective lens 44.

Furthermore, the stage driving control portion 61 drives and controls the stage driving mechanism 22, and moves the stage 21 in the orthogonal direction (the Z-axis direction (that is, an inner direction of the tissue slice)) of the stage surface so that the part of the biological sample SPL to be allocated to the light concentration portion is matched with the focus of the objective lens 44.

The illumination control portion 62 sets the parameter depending on the bright-field mode or the dark-field mode in the expansion image illumination light source 41 or a light source (not shown), and irradiates the illumination light from the expansion image illumination light source 41 or the light source (not shown).

When the illumination light is irradiated from the expansion image illumination light sources 41 or the light source (not shown), the illumination light is gathered in the reference position of the preparation slide disposition surface in the stage 21 by the condenser lens 42. On the image formation surface of the objective lens 44, among the biological sample SPL in the preparation slide PRT, the image of the light concentration portion to be concentrated by the condenser lens 42 is expanded and formed, and the expanded image is formed on the imaging surface of the expansion image imaging element 45 as a subject image by the objective lens 44.

The expansion image imaging control portion 64 sets the parameter depending on the bright-field mode or the dark-filed mode in the expansion image imaging element 45 and acquires the data of the expansion image of the biological sample SPL part to be formed on the imaging surface of the expansion image imaging element 45.

As a result, the microscope 20 divides the biological sample SPL into a plurality of imaging regions and can preserve the expansion image which expanded and imaged the divided imaging regions and the above-mentioned thumbnail image in a corresponding manner.

Incidentally, a generalization control portion 60 taking control of the microscope 20 and the auto loader 10 is present in the microscope 20, and the generalization control portion 60 is connected to the stage driving control portion 61, the illumination control portion 62, the thumbnail image imaging control portion 63, the expansion image imaging control portion 64, and the auto loader driving control portion 14, via the data communication path, respectively. The generalization control portion 60 is a computer which includes a CPU, a ROM, a RAM, an operational circuit, a HDD (Hard Disk drive) or the like.

In the generalization control portion 60, a program (hereinafter, also referred to as an automatic loading process program) which loads the preparation slide PRT from the auto loader 10 in the stage 21 of the microscope 20 and a program which acquires the thumbnail image and the expansion image are stored in the ROM and the HDD. In addition, in the generalization control portion 60, various programs including a program (hereinafter, also referred to as an automatic discharging processing program), which discharges the preparation slide PRT from the stage 21 of the microscope 20 to the auto loader 10, are stored in the ROM and the HDD.

The generalization program 60 develops the program corresponding to the execution command among various programs stored in the ROM and the HDD to the RAM, and suitably controls the stage driving control portion 61, the illumination control portion 62, the thumbnail image imaging control portion 63, the expansion image imaging control portion 64, and the auto loader driving control portion 14 depending on the developed program.

1-4. Configuration of Stage

Figure 3:
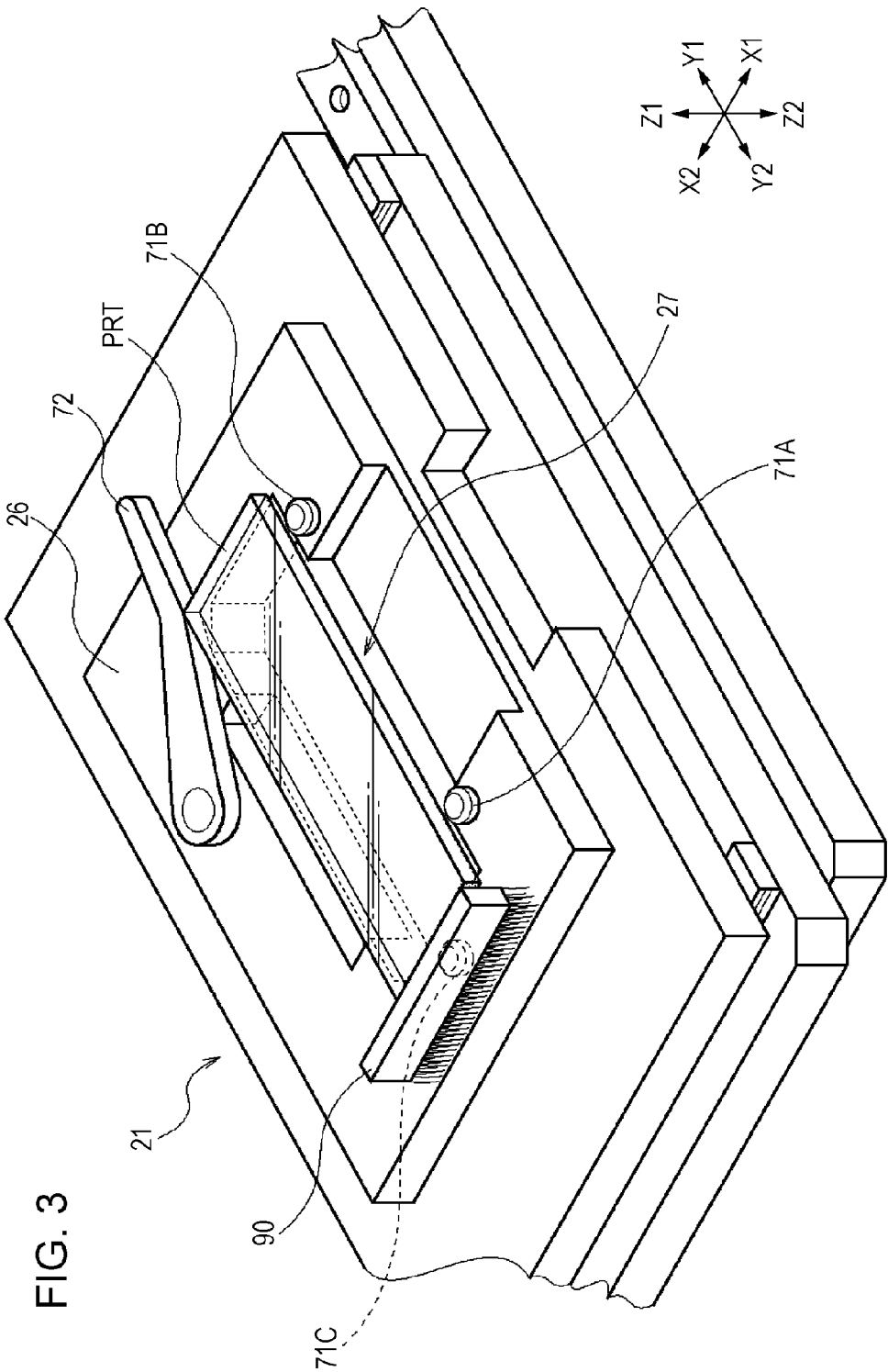
FIG. 3 is a schematic diagram showing configuration (2) of a stage.

Incidentally, as shown in FIG. 3, on the upper surface of the mounting table 26 in the stage 21, near both ends of a long side, holding protrusions 71A and 71B having approximately a cylindrical shape are protruded so as to be separated from the long side of a X1 side of the opening portion 27 by a predetermined distance. Furthermore, on the upper surface of the mounting table 26, a holding protrusion 71C having approximately a cylindrical shape is protruded so as to be separated from a short side of a Y2 side of the opening portion 27 by a predetermined distance.

The holding protrusions 71A to 71C are configured so that, when the preparation slide PRT is mounted in the reference position in the mounting table 26, the holding protrusions 71A, 71B and 71C come into contact with the X1 side surface and the Y2 side surface, which are adjacent side surfaces of the preparation slide PRT, respectively, to regulate and position the preparation slide PRT in the reference position.

Furthermore, on the mounting table 26, a suppression portion 72 is provided at an opposite angle (X2-Y1 angle) side of an angle (X1-Y2 angle) which is formed by the long side adjoining the holding protrusions 71A and 71B and the short side adjoining the holding protrusion 71C in the opening portion 27.

The suppression portion 72 comes into contact with the X2-Y1 angle of the preparation slide PRT mounted in the reference position in the stage 21 and suppresses the preparation slide PRT in the reference position by biasing the same in the X1-Y2 angel direction.

Furthermore, the upper end portions of the holding protrusions 71A to 71C have a shape of a truncated cone such that an angular portion is cut off over a circumferential direction, and have a so-called taper shape. For this reason, even if the preparation slide PRT is mounted at a position which slightly deviates from the reference position in the X1 direction or the Y2 direction, the holding protrusions 71A to 71C can return the preparation slide PRT to the reference position by causing the same to slide and drop into the mounting table 26.

1-5. Automatic Loading Process

In a case where the instruction of executing the automatic loading process program of the preparation slide PRT is received when the biological sample image including the thumbnail image and the expansion image is acquired, the generalization control portion 60 develops the automatic loading program to the RAM to carry out the automatic loading process.

Figure 4:
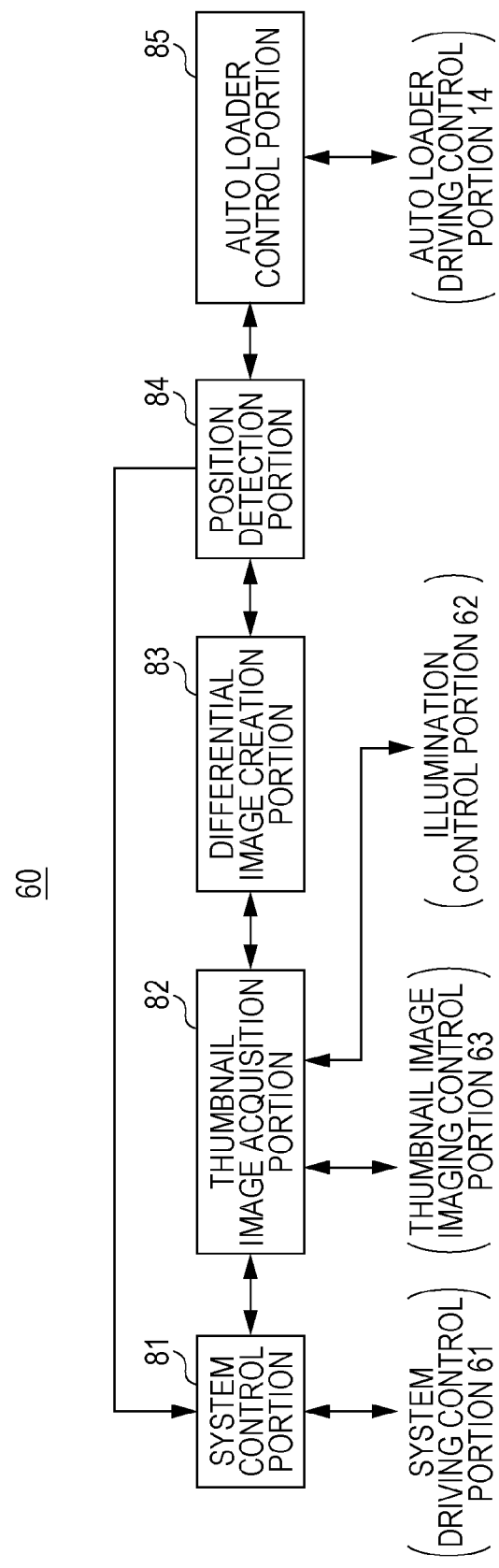
FIG. 4 is a schematic diagram showing a functional configuration of a generalization control portion.

As shown in FIG. 4, the generalization control portion 60 functions as a stage control portion 81, a thumbnail image acquisition portion 82, a differential image creation portion 83, a position detection portion 84, and an auto loader control portion 85, in accordance with the automatic loading program.

The stage control portion 81 moves the stage 21 to the thumbnail image imaging position via the stage driving control portion 61 and the stage driving mechanism 22 (FIG. 1) before imaging the preparation slide PRT.

As shown in FIG. 5A which shows the state of viewing the stage 21 of this time from above, the preparation slide PRT is not mounted on the stage 21, and the suppression portion 72 is situated at a position (hereinafter, also referred to as a non-suppression position) where the same does not come into contact with the preparation slide PRT even when the preparation slide PRT is mounted thereon.

The thumbnail image acquisition portion 82 (FIG. 4) images the image of the thumbnail image imaging scope ASN shown in FIG. 5A by the thumbnail image imaging element 34 (FIG. 1) via the thumbnail image imaging control portion 63, acquires and records the thumbnail image before loading it in the HDD. Herein, primarily, the thumbnail image is one which images the image including the whole preparation slide PRT, but the stage 21 is imaged at this stage.

Figure 6A:
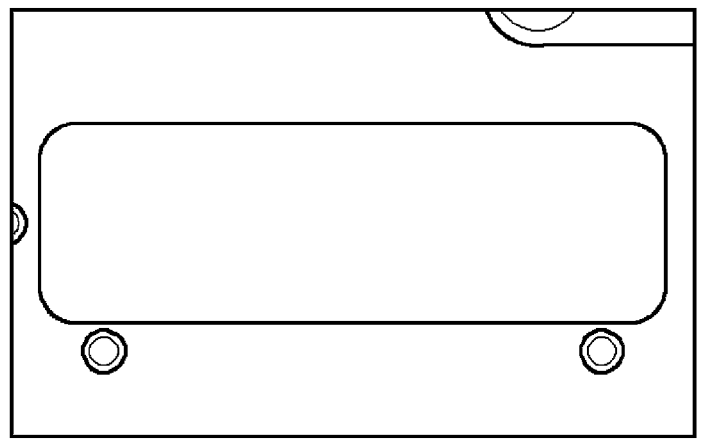
FIGS. 6A and 6B are schematic diagrams showing a standard image.

Incidentally, in the HDD in the generalization control portion 60, a before-loaded standard image is stored which is an image that images the thumbnail image imaging scope ASN in the stage 21 before the preparation slide PRT is mounted in advance, as shown in FIG. 6A.

The differential image creation portion 83 (FIG. 4) creates the differential image by performing the image processing of the before-loaded standard image and the before-loaded thumbnail image recorded in the HDD.

The position detection portion 84 judges whether or not the differential image is 0 data, that is, the before-loaded standard image is identical to the before-loaded thumbnail image. At this time, when the before-loaded standard image is identical to the before-loaded thumbnail image, this indicates that the stage 21 is situated in the thumbnail image imaging position which is a suitable position where the thumbnail image should be imaged, and the preparation slide PRT performing the prior imaging does not remain in the stage 21.

In this manner, the generalization control portion 60 judges whether or not the preparation slide PRT remains on the stage 21 before mounting the same on the stage 21, whereby a case where the preparation slide PRT is further loaded on the stage 21 on which the preparation slide PRT is mounted in advance, thereby destroying the preparation slide PRT, is prevented.

Next, the auto loader control portion 85 drives the arm 12 via the auto loader driving control portion 14 (FIG. 1) and the arm driving mechanism 13, thereby mounting the preparation slide PRT on the stage 21.

As shown in FIG. 5B which shows a state of viewing the stage 21 of this time from above, the preparation slide PRT is mounted on the stage 21. Furthermore, the suppression portion 72 is rotated from the non-suppression position in the X1 direction by the control of the stage control portion 81 (FIG. 4) and comes into contact with the preparation slide PRT, thereby suppressing the preparation slide PRT in the reference position (hereinafter, a position where the suppression portion 72 comes into contact with the preparation slide PRT when the preparation slide PRT is mounted is also called a suppression position).

The thumbnail image acquisition portion 82 (FIG. 4) drives the thumbnail image illumination light source 31 (FIG. 1) via the illumination control portion 62, and irradiates the whole biological sample SPL from the thumbnail image illumination light source 31 with the irradiation light.

Furthermore, the thumbnail image acquisition portion 82 images the image of the thumbnail image imaging scope ASN including the whole preparation slide PRT shown in FIG. 5B, and acquires and records the after-loaded thumbnail image shown in FIG. 7 in the HDD, by the thumbnail image imaging element 34 via the thumbnail image imaging control portion 63.

Figure 6B:
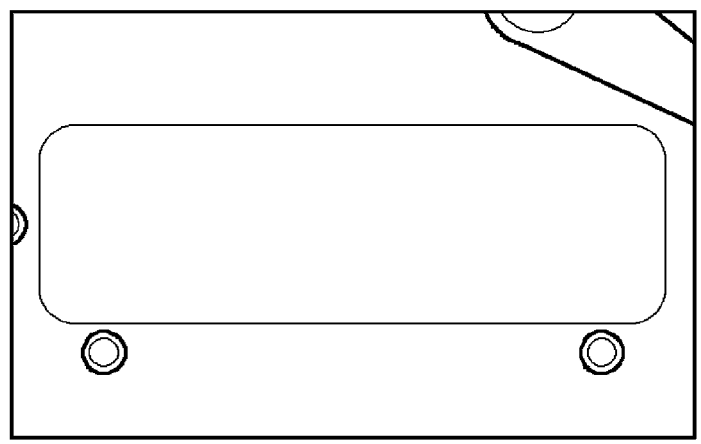

Incidentally, in the HDD in the generalization control portion 60, in addition to the above-mentioned before-loaded standard image, an after-loaded standard image is stored which is an image that images the thumbnail image imaging scope ASN in the stage 21 of the state in which the suppression portion 72 shown in FIG. 6B is moved to the suppression position in advance.

Figure 8A:
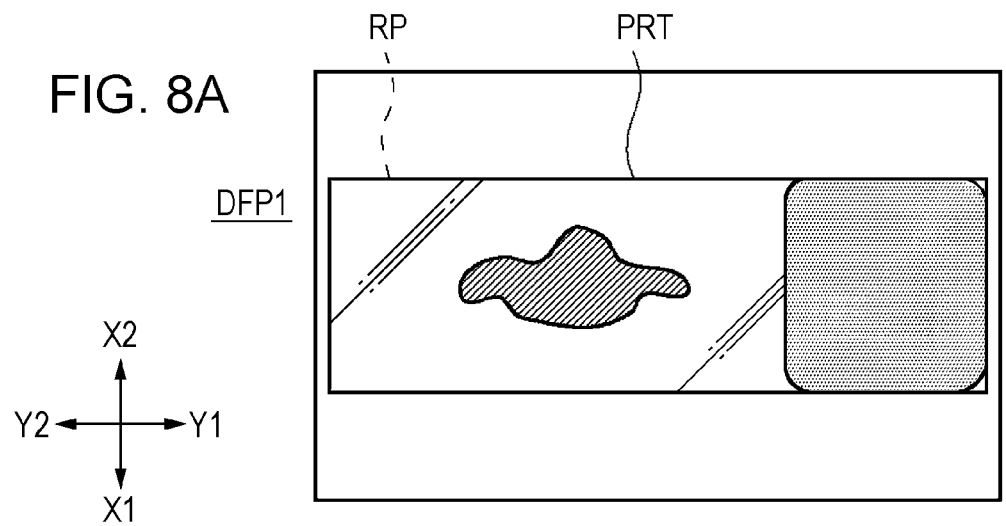
FIGS. 8A and 8B are schematic diagrams showing a differential image.

The differential image creation portion 83 (FIG. 4) creates the differential image DFP1 shown in FIG. 8A by performing the image processing of the after-loaded standard image and the after-loaded thumbnail image recorded in the HDD.

The position detection portion 84 judges whether or not the preparation slide PRT is in the reference position RP based on the differential image DFP1. In FIG. 8A, the exterior of the preparation slide PRT is in the same position as the reference position RP.

When the preparation slide PRT is in the reference position RP, the stage control portion 81 (FIG. 4) moves the stage 21 to the expansion imaging position via the stage driving control portion 61 and the stage driving mechanism 22.

Next, the generalization control portion 60 images the biological sample SPL in the preparation slide PRT via the expansion image imaging control portion 64 by the expansion image imaging element 45, and acquires and records the expansion image in the HDD.

In this manner, the generalization control portion 60 judges whether or not the preparation slide PRT is in the reference position RP, and when the preparation slide PRT is in the reference position RP, the generalization control portion 60 performs the acquisition of the expansion image.

Figure 9A:
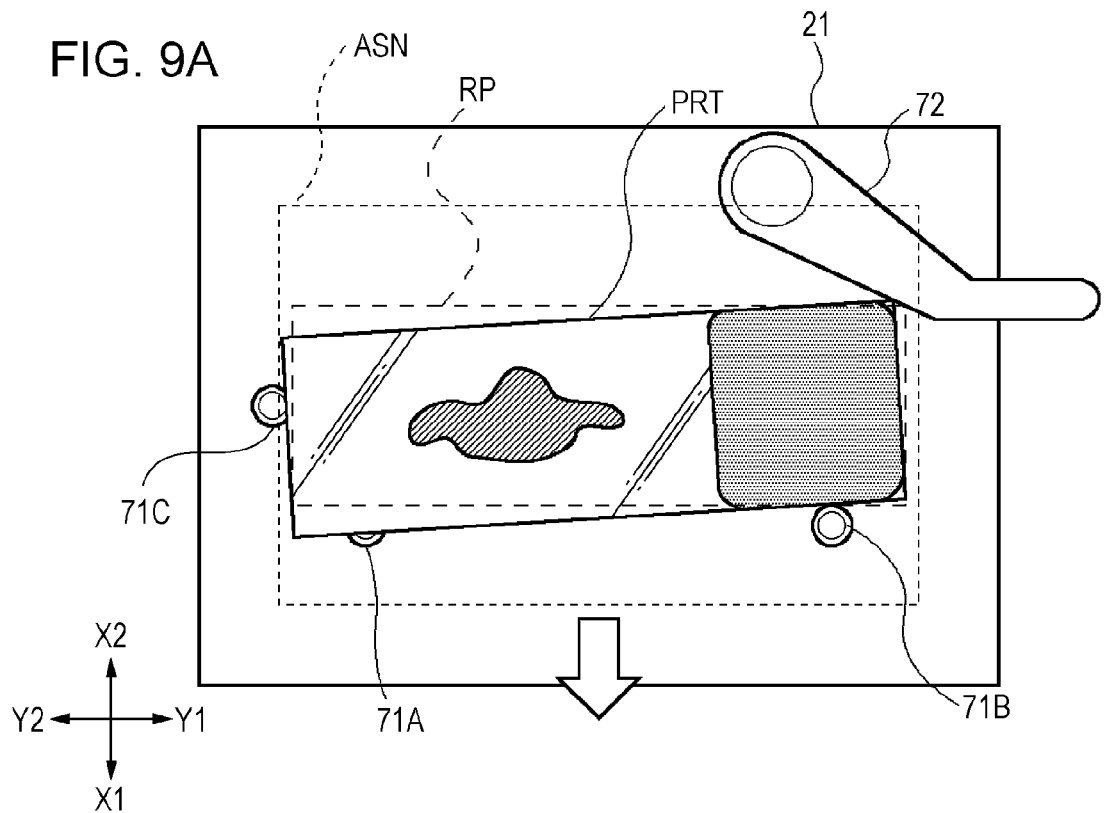
FIGS. 9A to 9C are schematic diagrams showing state (2) of a stage.
Figure 9B:
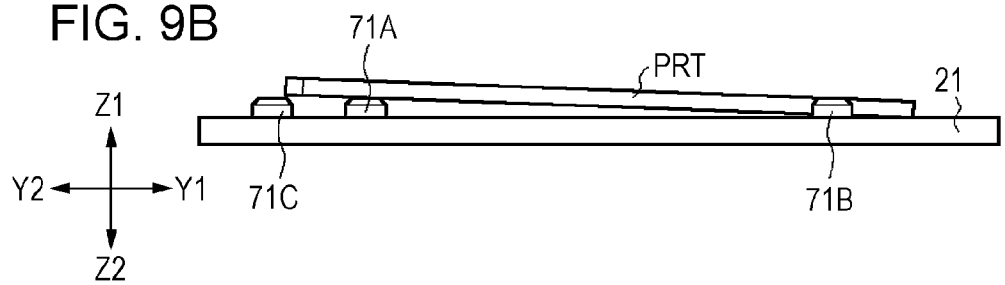

Incidentally, as shown in FIG. 9A, when the preparation slide PRT is mounted on the stage 21, the preparation slide PRT deviates from the reference position RP in the surface direction, for example, in the X1 direction in some cases. In this case, an end portion of the X1 side of the preparation slide PRT sits on the holding protrusion 71A as shown in FIG. 9B.

Figure 8B:
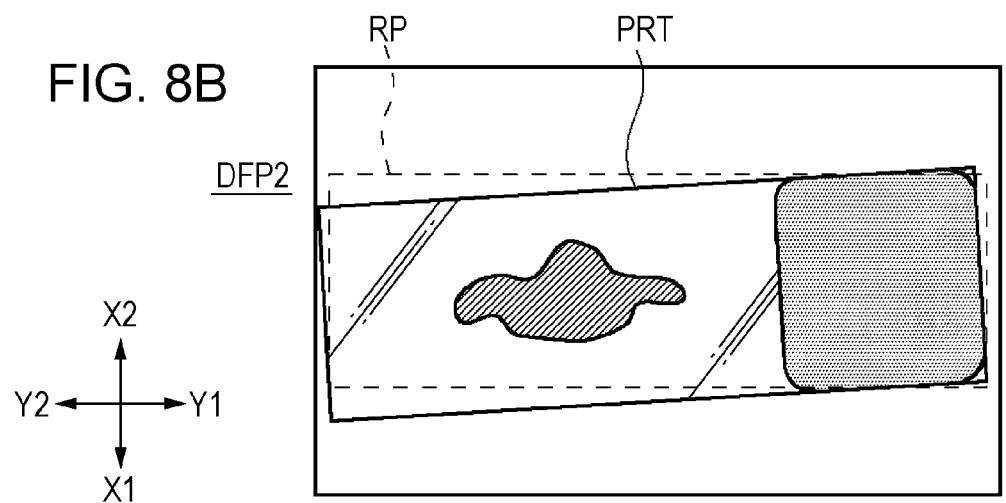

The differential image creation portion 83 (FIG. 4) creates a differential image DFP2, shown in FIG. 8B, by performing the image processing of the after-loaded standard image and the after-loaded thumbnail image recorded on the HDD. In the differential image DFP2, the preparation slide PRT deviates from the reference position RP in the X1 direction.

The position detection portion 84 judges that the preparation slide PRT deviates from the reference position RP in the X1 direction, based on the differential image DFP2.

In this manner, in a case where the preparation slide PRT deviates from the reference position RP of the stage 21, when moving the stage 21 to the expansion image imaging position, there is a possibility that the preparation slide PRT falls off from the stage 21 and is destroyed.

On the contrary, the generalization control portion 60 performs the position modification so as to return the preparation slide PRT to the reference position RP by moving the stage 21.

Figure 9C:
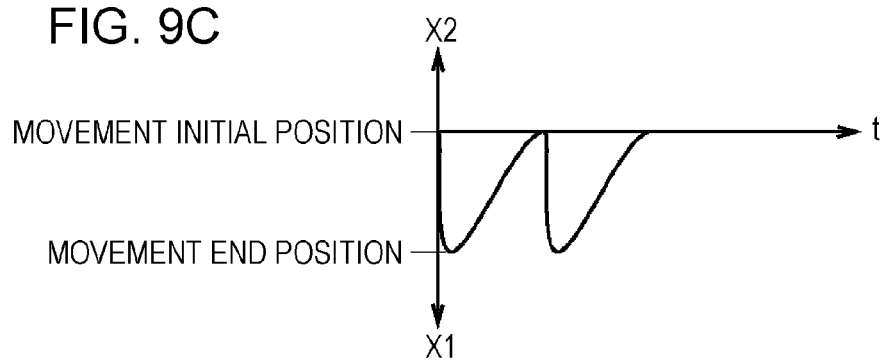

Actually, the stage control portion 81 moves the suppression portion 72 to the non-suppression position via the stage driving control portion 61 and the stage driving mechanism 22. Next, as shown in FIG. 9C, the stage control portion 81 quickly moves the stage from a movement initial position, which is a current position of the stage 21, to a movement end position separated in a position deviation direction (the X1 direction) of the preparation slide PRT relative to the reference position RP by a predetermined distance (for example, 1 [cm]) in one direction.

At this time, the stage control portion 81 moves the stage 21 at a pressing speed which is a speed that generates a force exceeding a frictional force in the contact point between the holding protrusion 71A and the preparation slide PRT and a frictional force in the contact point between the preparation slide PRT and the stage 21. As a result, the stage control portion 81 moves the preparation slide PRT in the X2 direction (the reference position RP) so as to cause the same to slide on the holding protrusion 71A.

Next, the stage control portion 81 moves the stage 21, which is situated in the movement end position, to the movement initial position in one direction at a return speed (for example, a speed of ½ of the pressing speed) that is slower than the pressing speed.

In this manner, the stage control portion 81 prevents the preparation slide PRT from receding from the reference position RP without being moved in the X1 direction, by moving the stage 21 to the movement initial position slower than the pressing speed.

Next, the stage control portion 81 moves the suppression portion 72 to the suppression position, and the differential image creation portion 83 creates the differential image as mentioned above, and the position detection portion 84 judges whether or not the preparation slide PRT deviates from the reference position RP again, based on the differential image.

At this time, when the position detection portion 84 judges that the preparation slide PRT still deviates from the reference position RP in the X1 direction, the stage control portion 81 moves the preparation slide PRT in the X2 direction (a direction to the reference position RP) by moving the stage 21 in the X1 direction again, as shown in FIG. 9C.

Next, the differential image creation portion 83 creates the differential image as mentioned above, and the position detection portion 84 judges whether or not the preparation slide PRT deviates from the reference position RP again, based on the differential image.

In this manner, even if the position modification of the preparation slide PRT is performed twice, when the position deviation of the preparation slide PRT is detected by the position detection portion 84, since the position modification of the preparation slide PRT is difficult and there is a necessity to progress the imaging of the next preparation slide PRT, the stage control portion 81 stops the position modification of the preparation slide PRT, and forcibly removes the preparation slide PRT from the stage 21.

Figure 10A:
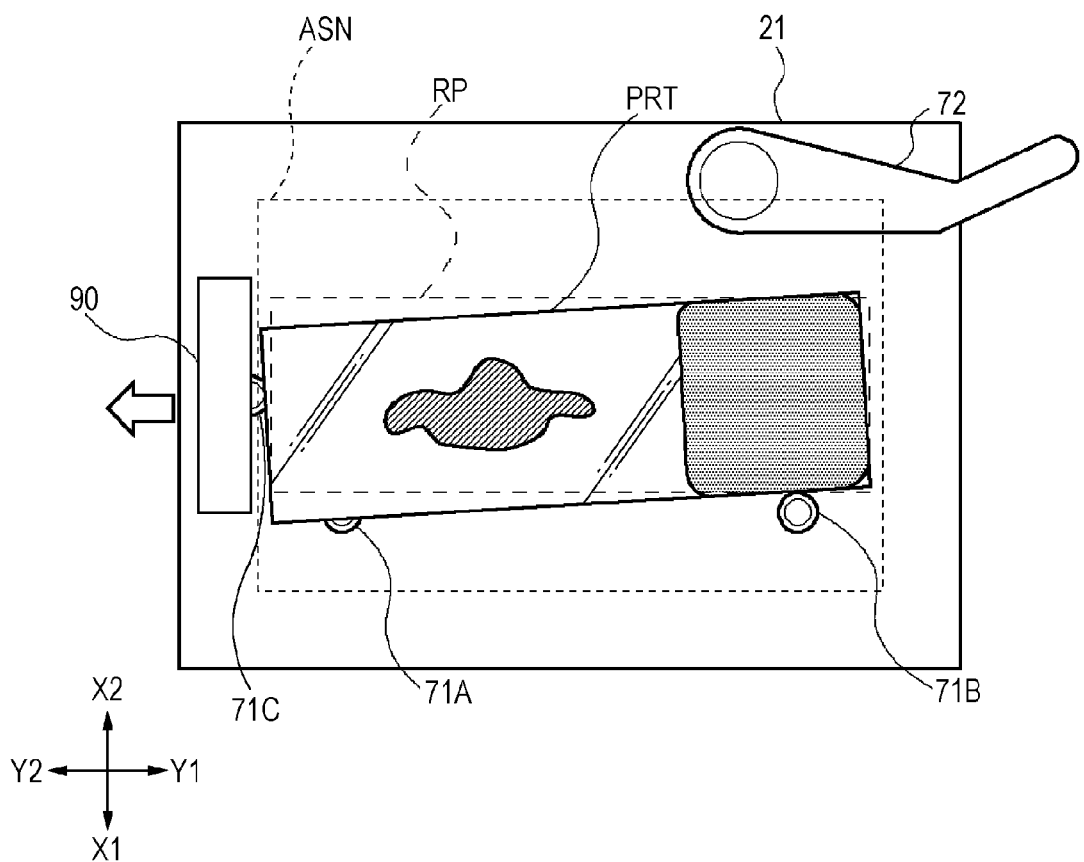
FIGS. 10A and 10B are schematic diagrams showing state (3) of a stage.
Figure 10B:
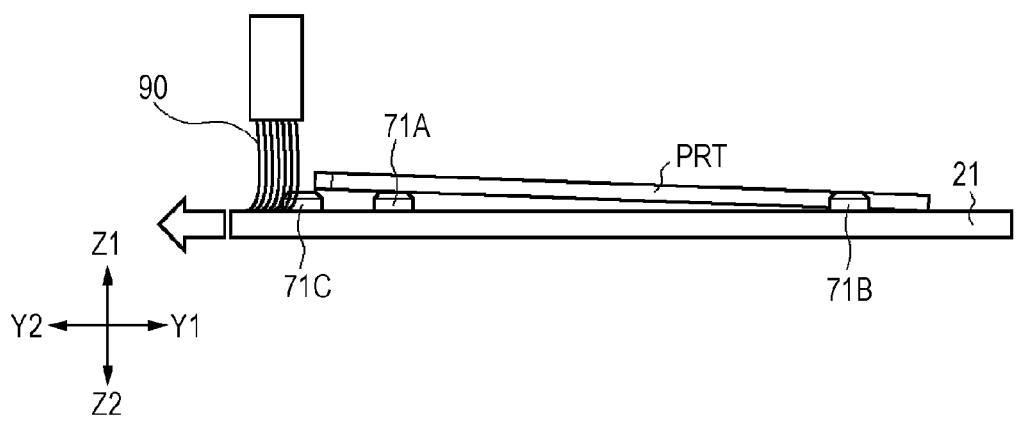

Actually, as shown in FIG. 10A, the stage control portion 81 brings a front end portion of a brush 90 fixed to the microscope 20 into contact with the preparation slide PRT and removes the same from the Y1 end portion of the stage 21 in which the holding protrusion is not provided, by moving the suppression portion 72 to the non-suppression position and moving the stage 21 in the Y2 direction.

The preparation slide PRT is removed from the stage 21 by being dropped onto an exclusion tray (not shown). In addition, since a cushion is on the exclusion tray, the preparation slide PRT is not destroyed.

1-6. Automatic Discharging Process

In a case where the generalization control portion 60 receives the instruction of executing an automatic discharging process program of the preparation slide PRT upon discharging the preparation slide PRT which performs the imaging of the expansion image to the auto loader 10, the generalization control portion 60 deploys the automatic discharging program to the RAM to carry out the automatic discharging process.

The generalization control portion 60 functions as the stage control portion 81, the thumbnail image acquisition portion 82, the differential image creation portion 83, the position detection portion 84 and the auto loader control portion 85 according to the automatic discharging program, similarly to the function at the time of executing the automatic loading program shown in FIG. 4.

The stage control portion 81 moves the stage 21 to the thumbnail image imaging position via the stage driving control portion 61 and the stage driving mechanism 22 before discharging the preparation slide PRT.

Next, similarly to the above-mentioned automatic loading process, the thumbnail image acquisition portion 82 images the after-loaded thumbnail image, the differential image creation portion 83 creates the differential image based on the after-loaded thumbnail image and the after-loaded standard image, and the position detection portion 84 judges whether or not the preparation slide PRT deviates from the reference position RP based on the differential image.

Herein, when the preparation slide PRT deviates from the reference position, the stage control portion 81 performs the position modification of the preparation slide PRT similarly to the above-mentioned automatic loading process.

Meanwhile, when the preparation slide PRT is situated in the reference position RP, the auto loader control portion 85 discharges the preparation slide PRT from the stage 21 to the preparation slide cartridge 11 by driving the arm 12.

Next, similarly to the above-mentioned automatic loading process, the thumbnail image acquisition portion 82 images the before-loaded thumbnail image, and the differential image creation portion 83 creates the differential image based on the before-loaded thumbnail image and the before-loaded standard image. The position detection portion 84 judges whether or not the preparation slide PRT remains in the stage 21 based on the differential image.

In this manner, the generalization control portion 60 confirms that the preparation slide PRT is reliably discharged from the stage 21 after discharging the preparation slide PRT. As a result, the generalization control portion 60 can prevent the next imaging target preparation slide PRT from being loaded on the stage 21 in which the preparation slide PRT remains, which destroys the preparation slide PRT.

1-7. Automatic Loading Process Sequence

Figure 11:
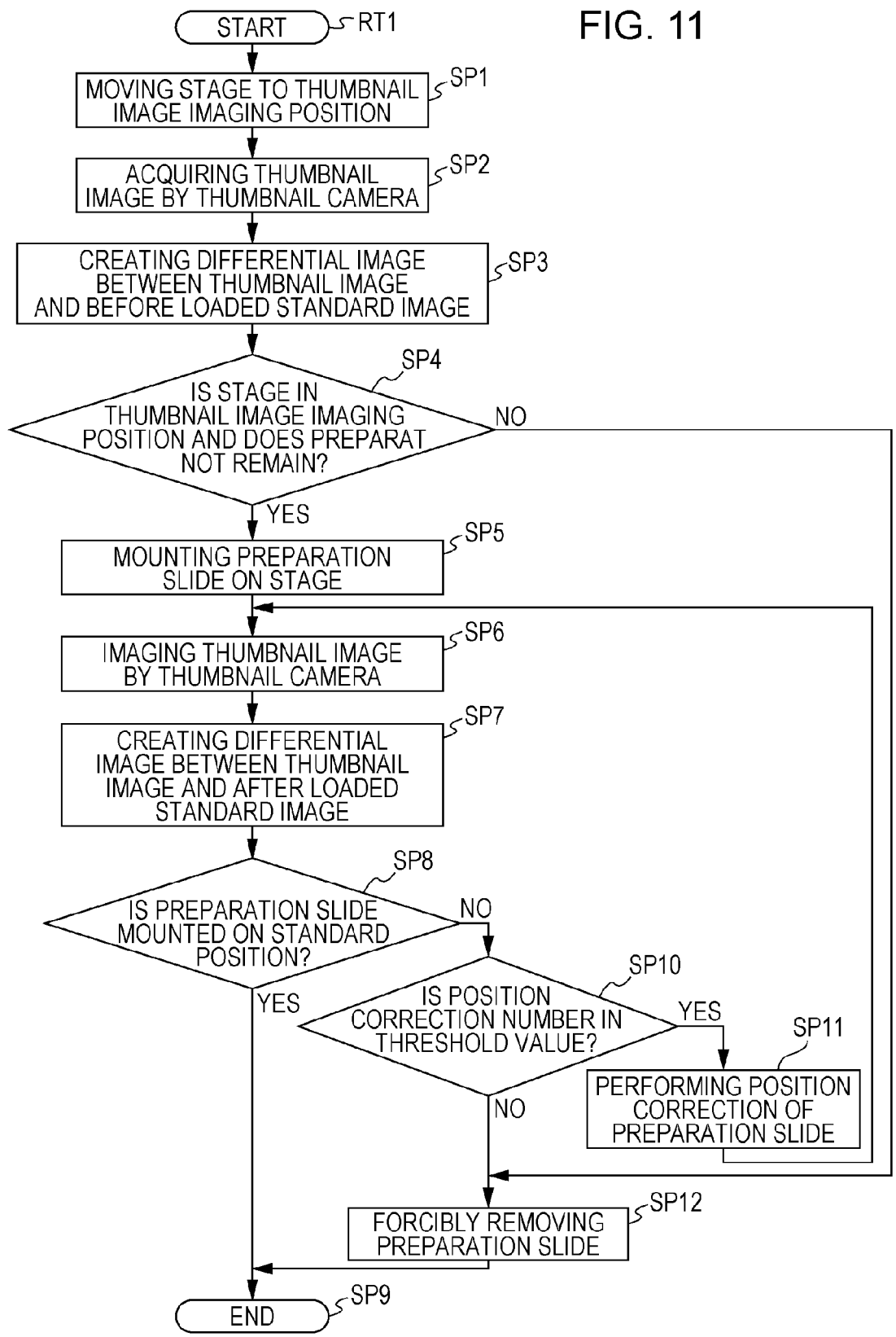
FIG. 11 is a flow chart showing an automatic loading process sequence.

Next, the sequence of the above-mentioned automatic loading process will be described based on the flow chart shown in FIG. 11.

Actually, the generalization control portion 60 enters the start step of an automatic loading processing sequence RT1 and shifts to the next step SP1. In step SP1, the generalization control portion 60 controls the stage driving control portion 61, moves the stage 21 to the thumbnail image imaging position and shifts to the next step SP2.

In step SP2, the generalization control portion 60 controls the thumbnail image imaging control portion 63, acquires the thumbnail image (actually, the image of the stage 21), which is imaged by the thumbnail image imaging portion 30, and shifts to the next step SP3.

In step SP3, the generalization control portion 60 creates a differential image between the before-loaded standard image and the thumbnail image acquired in step SP2, and shifts to the next step SP4.

In step SP4, the generalization control portion 60 judges whether or not the stage 21 is in the thumbnail image imaging position and the preparation slide PRT remains in the stage 21, based on the differential image.

Herein, when a denial result is obtained, this indicates that the preparation slide PRT is not be loaded on the stage 21, and, at this time, the generalization control portion 60 shifts to step SP12 and forcibly removes the preparation slide PRT from the stage 21. Thereafter, the generalization control portion 60 shifts to step SP9, finishes the automatic loading process sequence RT1, and performs the loading of the next preparation slide PRT.

Meanwhile, when an affirmation result is obtained in step SP4, this indicates that the preparation slide PRT may be mounted on the stage 21, and, at this time, the generalization control portion 60 shifts to step SP5.

In step SP5, the generalization control portion 60 controls the auto loader driving control portion 14, mounts the preparation slide PRT on the stage 21, and shifts to the next step SP6.

In step SP6, the generalization control portion 60 controls the thumbnail image imaging control portion 63, acquires the thumbnail image which is imaged by the thumbnail image imaging portion 30, and shifts to the next step SP7.

In step SP7, the generalization control portion 60 creates the differential image between the after-loaded standard image and the thumbnail image acquired in step SP6, and shifts to the next step SP8.

In step SP8, the generalization control portion 60 judges whether or not the preparation slide PRT is mounted in the reference position, based on the differential image. Herein, when the affirmation result is obtained, the generalization control portion 60 shifts to step SP9, finishes the automatic loading process sequence RT1, and then performs the imaging of the expansion image.

Meanwhile, when the denial result is obtained in step SP8, this indicates that, since the preparation slide PRT is not mounted in the reference position RP, it is necessary to perform the position modification, and at this time, the generalization control portion 60 shifts to step SP10.

In step SP10, the generalization control portion 60 judges whether or not the position modification number is smaller than a predetermined threshold value. Herein, when the affirmation result is obtained, this indicates that, since the position modification number does not exceed the threshold value, the position modification of the currently mounted preparation slide PRT is performed, and at this time, the generalization control portion 60 shifts to step SP11.

In step SP11, the generalization control portion 60 performs the position modification of the above-mentioned preparation slide PRT, then returns to step SP6 to perform the imaging of the thumbnail image again, and judges whether or not the preparation slide PRT is moved to the reference position RP.

Meanwhile, when the denial result is obtained in step SP10, this indicates that, since the position modification number exceeds the threshold value, the currently mounted preparation slide PRT does not progress to the imaging of the expansion image, and the imaging of the next preparation slide PRT progresses.

At this time, the generalization control portion 60 shifts to step SP12 to forcibly remove the preparation slide PRT from the stage 21, then shifts to step SP9 to finish the automatic loading process sequence RT1, and then performs the loading of the next preparation slide PRT.

1-8. Automatic Discharging Process Sequence

Figure 12:
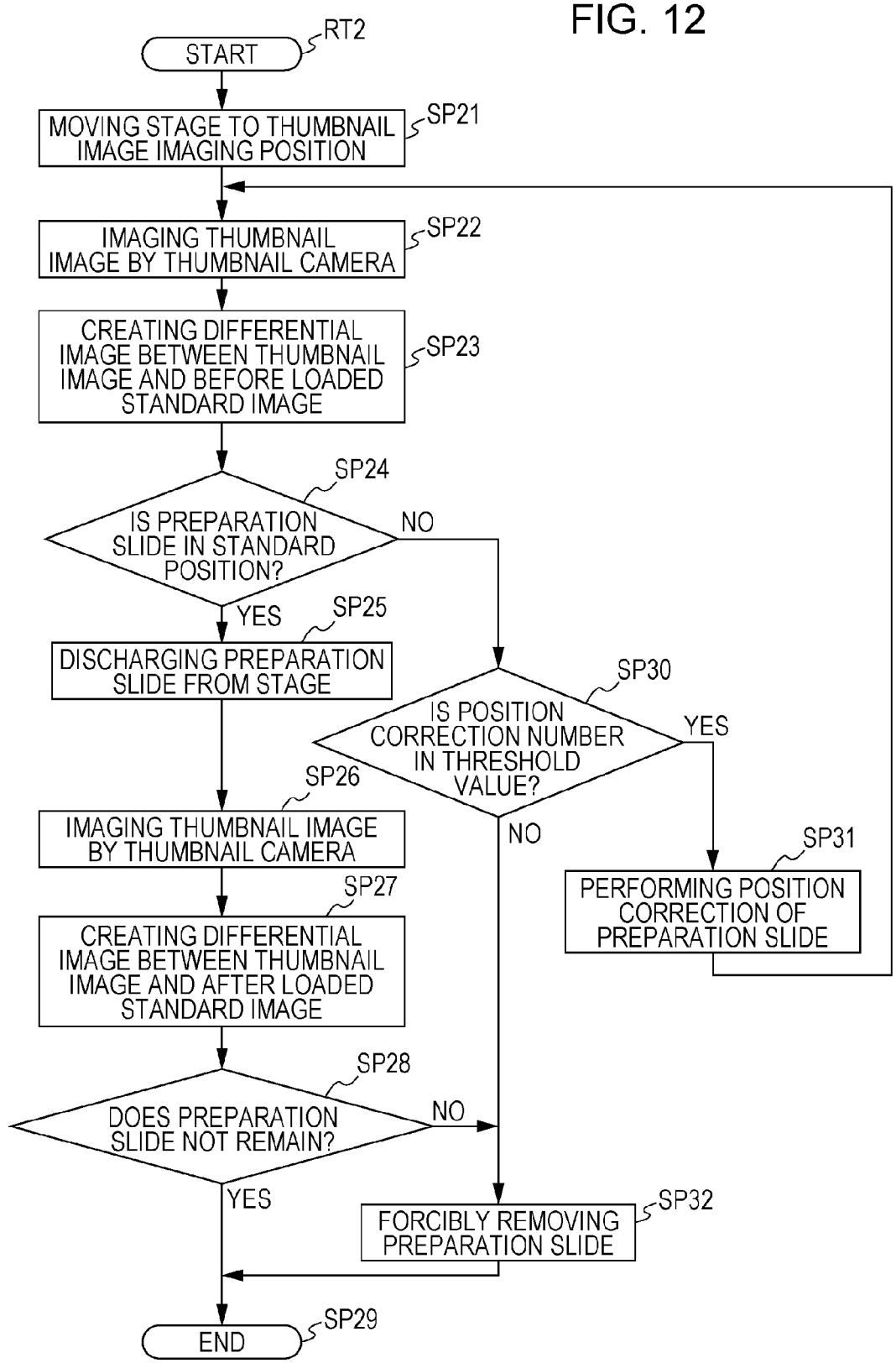
FIG. 12 is a flow chart showing an automatic discharging processing sequence.

Next, the sequence of the above-mentioned automatic discharging process will be described based on the flow chart shown in FIG. 12.

Actually, the generalization control portion 60 enters the start step of an automatic discharging process sequence RT2 and shifts to the next step SP21. In step SP21, the generalization control portion 60 controls the stage driving control portion 61, moves the stage 21 to the thumbnail image imaging position and shifts to the next step SP22.

In step SP22, the generalization control portion 60 controls the thumbnail image imaging control portion 63, acquires the thumbnail image, which is imaged by the thumbnail image imaging portion 30, and shifts to the next step SP23.

In step SP23, the generalization control portion 60 creates a differential image between the after-loaded standard image and the thumbnail image acquired in step SP22, and shifts to the next step SP24.

In step SP24, the generalization control portion 60 judges whether or not the preparation slide PRT is in the reference position, based on the differential image.

Herein, when an affirmation result is obtained, this indicates that the preparation slide PRT may be discharged from the stage 21, and, at this time, the generalization control portion 60 shifts to step SP25 to discharge the preparation slide PRT from the stage 21 to the preparation slide cartridge 11, and then shifts to the next step SP26.

In step SP26, the generalization control portion 60 controls the thumbnail image imaging control portion 63, acquires the thumbnail image which is imaged by the thumbnail image imaging portion 30, and shifts to the next step SP27.

In step SP27, the generalization control portion 60 creates the differential image between the before-loaded standard image and the thumbnail image acquired in step SP26, and shifts to the next step SP28.

In step SP28, the generalization control portion 60 judges whether or not the preparation slide PRT remains in the stage 21, based on the differential image. Herein, when the affirmation result is obtained, the generalization control portion 60 shifts to step SP29, and finishes the automatic discharging process sequence RT2. Thereafter, the generalization control portion 60 carries out the automatic loading processing sequence RT1 (FIG. 11) and performs the loading of the preparation slide PRT becoming the next imaging target.

Meanwhile, when the denial result is obtained in step SP28, this indicates that the stage 21 remains in the preparation slide PRT.

At this time, the generalization control portion 60 shifts to step SP32 to forcibly remove the preparation slide PRT from the stage 21, then shifts to step SP29 to finish the automatic discharging process sequence RT2, and then performs the loading of the next preparation slide PRT.

Meanwhile, when the denial result is obtained in step SP24, this indicates that, since the preparation slide PRT is not mounted in the reference position PR, it is necessary to perform the position modification, and at this time, the generalization control portion 60 shifts to step SP30.

In step SP30, the generalization control portion 60 judges whether or not the position modification number is equal to or less than a predetermined threshold value. Herein, when the affirmation result is obtained, this indicates that, since the position modification number does not exceed the threshold value, the position modification of the currently mounted preparation slide PRT is performed, and at this time, the generalization control portion 60 shifts to step SP31.

In step SP31, the generalization control portion 60 performs the position modification of the above-mentioned preparation slide PRT, then returns to step SP22 to perform the imaging of the thumbnail image again, and judges whether or not the preparation slide PRT is moved to the reference position RP.

Meanwhile, when the denial result is obtained in step SP30, this indicates that, since the position modification number exceeds the threshold value, the currently mounted preparation slide PRT is not subjected to the position modification and not discharged to the preparation slide cartridge 11, and the next preparation slide PRT is loaded.

At this time, the generalization control portion 60 shifts to step SP32 to forcibly remove the preparation slide PRT from the stage 21, then shifts to step SP29 to finish the automatic discharging process sequence RT2, and then performs the loading of the next preparation slide PRT.

1-9. Operation and Effect

In the above-mentioned configuration, on the upper surface of the stage 21 of the microscope 20, holding protrusions 71A to 71C are provided in which side surfaces thereof come into contact with the preparation slide PRT when the preparation slide PRT is mounted on the reference position RP. As a result, the microscope 20 can restrict and position the preparation slide PRT to the reference position in the stage 21.

Furthermore, since the front end portions of the holding protrusions 71A TO 71C have taper shapes, even when the preparation slide PRT slightly deviates from the reference position and gets on the holding protrusions 71A to 71C, the holding protrusions 71A TO 71C can return the preparation slide PRT to the reference position RP by causing the preparation slide PRT to slide and drop into the mounting table 26.

Furthermore, when the preparation slide PRT deviates from the reference position RP, the microscope 20 presses the stage 21 from the movement initial position to the movement end position, which is a position deviation direction relative to the reference position RP of the preparation slide PRT, at a rapid pressing speed. As a result, the microscope 20 can move the preparation slide PRT in the reference position RP direction, thereby performing the position modification.

Furthermore, if the microscope 20 only merely vibrates the stage 21, that is, the return speed is approximately the same as the pressing speed, there is a concern that the preparation slide PRT, which was firstly moved in the reference position RP direction, is moved in a direction receding from the reference position RP again.

Meanwhile, in the present embodiment, the microscope 20 returns the stage 21 situated at the movement end position to the movement initial position at the return speed slower than the pressing speed. As a result, the microscope 20 can prevent the preparation slide PRT from receding from the reference position RP.

In this manner, the microscope 20 is adapted to modify the position when the preparation slide PRT causes the position deviation in the reference position RP. For this reason, it is possible to effectively perform the imaging of the preparation slide PRT without stopping the automatic imaging of the biological sample SPL by the loading error duet to the occurrence of the position deviation.

Furthermore, the microscope 20 can continue to image the preparation slide PRT of the next imaging target, by excluding the preparation slide PRT from the stage 21, in a case where the preparation slide PRT is not moved to the reference position RP even when a predetermined number of times of the position modification of the preparation slide PRT are carried out.

In this manner, the microscope 20 can image the whole preparation slide PRT stored in the preparation slide cartridge 11 by limiting the time which is necessary for the imaging of a sheet of preparation slide PRT including the time of the position modification.

Moreover, when the preparation slide PRT deviates from the reference position RP it is also possible to consider that the microscope 20 tilts the stage 21 to perform the position modification of the preparation slide PRT. However, in this case, there is a necessity for a certain degree of space in the up and down direction of the stage 21.

Meanwhile, in the microscope 20 according to the present embodiment, since the position modification of the preparation slide PRT is performed by moving the stage 21 in the stage surface direction, there is no necessity for a new space in the up and down direction. For this reason, in the microscope 20, it is possible to facilitate a component layout without enlarging the device configuration.

Furthermore, the microscope 20 according to the present embodiment can drive the stage 21 in a direction (the X axis-Y axis direction) parallel to the stage surface so as to move the thumbnail image imaging position and the expansion image imaging position.

The microscope 20 performs the position modification of the preparation slide PRT by driving the stage 21 that can naturally move in the direction parallel to the stage surface.

For this reason, the microscope 20 can perform the position modification without complicating the configuration thereof, such as separately providing a driving mechanism for performing the position modification of the preparation slide PRT.

Furthermore, the microscope 20 judges the position of the preparation slide PRT based on the differential image before and after loading the preparation slide PRT.

For this reason, the microscope 20 can accurately detect the position deviation of the preparation slide PRT without depending on the image (the slide 21 or the like) other than the preparation slide PRT, as compared to a case of only being based on the thumbnail image after loading the preparation slide PRT.

Herein, the thumbnail camera 32 improves the efficiency of the imaging and the easiness of the management of the expansion image data, by naturally imaging and maintaining the whole image of the preparation slide PRT including the label LB to correspond to the expansion image.

In the present embodiment, the microscope 20 judges the position of the preparation slide PRT relative to the stage 21 based on the thumbnail image imaged by the thumbnail camera 32.

For this reason, the microscope 20 can judge the position of the preparation slide PRT relative to the stage 21 without complicating the configuration thereof, such as separately providing a camera for judging the position of the preparation slide PRT relative to the stage 21.

According to the above configuration, the microscope 20 detects the position deviation of the preparation slide PRT relative to the reference position PR to be regulated by the holding protrusions 71A to 71C provided in the stage 21, from the thumbnail image including the preparation slide PRT with the biological sample SPL disposed thereon.

When the position deviation of the preparation slide PRT relative to the reference position RP is detected, the microscope 20 presses the stage 21 from the movement start position, which is the position of the detection point in time, in a direction corresponding to the position deviation at the pressing speed, and returns the stage 21 up to the movement start position at the return speed slower than the pressing speed.

For this reason, when the preparation slide PRT is mounted in the state of deviating from the reference position RP in the stage 21, the microscope 20 can cause the preparation slide PRT to approach the reference position RP, by causing the preparation slide PRT to slide on the upper part of holding protrusions and to move. As a result, the microscope 20 can very effectively image the biological sample SPL.

2. Other Embodiment

Moreover, in the above-mentioned embodiments, a case has been described where the stage 21 is moved to the movement end position separated from the movement initial position by 1 [cm], when the position modification of the preparation slide PRT is performed. The embodiment of present application may apply various movement distances, for example, such as 2 [cm], without being limited thereto. In brief, the preparation slide PRT may slide on the upper parts of the holding protrusions and move in the reference position RP direction.

Furthermore, in the differential image, the movement distance of the stage 21 may be changed depending on the position deviation amount relative to the reference position RP, for example, the greater the position deviation amount of the preparation slide PRT relative to the reference position RP is, the longer distance the stage 21 is moved.

In addition, the pressing speed of the stage 21 may be changed depending on the position deviation amount relative to the reference position RP, for example, the greater the position deviation amount of the preparation slide PRT relative to the reference position RP, the faster the stage 21 is moved from the movement initial position to the movement end position.

In this case, when the return speed is not changed while the greater the position deviation is, the faster the pressing speed is, it is possible to prevent the preparation slide PRT from receding from the reference position RP.

Meanwhile, in the above-mentioned embodiment, a case has been described where the stage 21 situated at the movement end position and moved to the movement initial position at the return speed which is a speed of ½ of the pressing speed.

The present application may apply various return speeds, for example, speed of ⅓ of the pressing speed or the like without being limited thereto. In brief, the preparation slide PRT may not slide on the upper part of the holding protrusions and may not recede from the reference position RP.

Furthermore, in the above-mentioned embodiment, a case has been described where the position modification of the preparation slide PRT is performed by moving the stage 21 in the X1 direction which is a one axis direction, when the preparation slide PRT deviates from the reference position RP in the X1 direction which is a one axis direction.

The present application is not limited thereto, and, for example, when the preparation slide PRT deviates from the reference position RP in the X1 direction and the Y2 direction perpendicular to the X1 direction (that is, the preparation slide PRT gets on the holding protrusions 71A and 71C), the stage 21 may be moved in a two axes direction, for example, such as being moved in a middle direction between the X1 direction and the Y2 direction.

Furthermore, upon being moved in a two axes direction, the stage 21 may be moved by various moving methods, such as moving the stage 21 in the Y2 direction after moving in the X1 direction.

Furthermore, in the above-mentioned embodiments, a case has been described where the position modification of the preparation slide PRT is performed twice. The present application is not limited thereto, and if the number does not greatly affect the automatic acquisition of the biological sample image in a plurality of preparation slides PRT in time, the position modification may be performed in an arbitrary number, for example, three times and the like.

Furthermore, in the above-mentioned embodiments, a case has been described where the upper end portions of the holding protrusions 71A to 71C have the taper shape. The present application is not limited thereto, and the upper end portions of the holding protrusions 71A to 71C may not have the taper shape but simply may have a cylindrical shape. Furthermore, for example, the holding protrusions 71A to 71C may have various shapes such as a conical shape or a quadrangular pyramid shape.

Furthermore, in the above-mentioned embodiments, a case has been described where two holding protrusions 71A and 71B are provided at the X1 side on the upper surface of the mounting table 26 of the stage 21, and one holding protrusion 71C is provided at the Y2 side thereof.

The present application is not limited thereto, the number of the holding protrusions of the X1 side on the upper surface of the mounting table 26 may be increased to three, on the contrary, the number may be reduced to one and may be provided in an arbitrary number. In this manner, the number of the holding protrusions of the Y2 side may also be provided in an arbitrary number.

In addition, the holding protrusions may be provided at the X2 side or the Y1 side on the upper surface of the mounting table 26. Furthermore, the holding protrusions are not limited to the shape of approximately a cylinder, but, for example, the holding protrusion stretching in the Y axis direction may be provided at the X1 side in the mounting table 26. The same is also true for the Y2 side, X2 side, and Y1 side in the mounting table 26. In brief, the holding protrusions may have a convex shape relative to the stage 21 which can restrict and position the preparation slide PRT in the reference position.

Furthermore, in the above-mentioned embodiments, a case has been described where the thumbnail camera 32 is disposed physically immediately over the preparation slide PRT in the thumbnail imaging position.

The present application is not limited thereto, for example, the thumbnail image may be guided to the thumbnail image imaging element by disposing the thumbnail camera 32 at the side surface of the preparation slide PRT in the thumbnail image imaging position and providing a mirror between the preparation slide PRT and the thumbnail camera 32. In brief, the thumbnail camera 32 may be disposed optically immediately over the preparation slide PRT in the thumbnail image imaging position.

Furthermore, in the above-mentioned embodiment, a case has been described where the before-loaded thumbnail image and the after-loaded thumbnail image are imaged by the thumbnail camera 32.

The present application is not limited thereto, and cameras may be separately provided which image the before-loaded thumbnail image and the after-loaded thumbnail image. In brief, the microscope 20 may confirm whether or not the preparation slide PRT is mounted in the reference position RP, after the preparation slide PRT is mounted on the stage 21 in the thumbnail image imaging position, and before the stage 21 is started to move to the expansion image imaging position.

Furthermore, in the above-mentioned embodiments, a case has been described where the preparation slide PRT is forcibly removed by moving the stage 21 PRT with respect to the brush 90 fixed to the microscope 20.

The present application is not limited thereto, for example, the preparation slide PRT may be forcibly removed from the stage 21 by various methods such as moving the brush 90 by a predetermined driving unit without moving the stage 21. At this time, it is desirable that the preparation slide PRT is not destroyed.

Furthermore, in the above-mentioned embodiments, a case has been described where the expansion image illumination light source 41 which irradiates the bright-field illumination light, and a light source (not shown), which irradiates the dark-field illumination light, are disposed. The present application is not limited thereto, only one of the expansion light illumination light source 41, which can switch over the bright-field illumination light and the dark-field illumination light, or a light source (not shown) may be disposed. Furthermore, a plurality of light source elements, which irradiates the irradiation light having different wavelength regions, may be disposed inside the expansion image illumination light source 41. Similarly, a plurality of light source elements, which irradiates the irradiation light having the different wavelength regions, may be disposed in a light source (not shown).

Furthermore, in the above-mentioned embodiments, a case has been described where the scope of the rectangular shape including the whole preparation slide PRT with the biological sample SPL disposed thereon is the thumbnail image imaging scope ASN. The present application is not limited thereto, if the scope includes the whole biological sample SPL, the whole preparation slide PRT may not be included. Furthermore, in addition to the scope of the rectangular shape, the scope may include various shapes such as, for example, a circular shape. In brief, the scope may include the whole preparation slide PRT and include the preparation slide PRT only to the extent that the position deviation of the preparation slide PRT relative to the reference position RP can be detected.

Moreover, in the above-mentioned embodiments, a case has been described where the biological sample SPL is formed of the tissue slice, but the present application is not limited thereto, and the biological sample SPL may be a biopolymer such as a cell or a chromosome. Furthermore, the sample fixed to the preparation slide PRT is not limited to the biological sample SPL, but, for example, may be a target such as an electronic component, which is imaged and in which the image thereof is preserved.

Furthermore, in the above-mentioned embodiments, the preparation slide PRT has been described which is constituted by pinching the biological sample SPL between the glass slide and the cover glass. The present application is not limited thereto, and the cover glass may be omitted. Furthermore, for example, the sample may be supported by the support plate formed of a substance other than glass, such as plastic.

Furthermore, in the above-mentioned embodiments, a case has been described where the generalization control portion 60 carries out the above-mentioned automatic loading process and the automatic discharging process according to the application program which is stored in the ROM and the HDD in advance.

The present application is not limited thereto, and the generalization control portion 60 may carry out the above-mentioned automatic loading process and the automatic discharging process according to an application program installed from the memory medium or an application program downloaded from internet, and an application program installed by various other routes.

Furthermore, in the above-mentioned embodiments, a case has been described where the microscope 20 as a microscope is constituted by the stage 21 as a stage, the holding protrusions 71A to 71C as convex portions, the position detection portion 84 as a position detection portion, and the stage control portion 81 as a stage control portion.

The present application is not limited thereto, and the microscope may be constituted by a stage, a convex portion, a position detection portion, and a stage control portion having various other configurations.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A stage control device comprising:
    a position detection portion configured to detect a positional deviation of a support plate that is positioned on a stage, relative to a support plate reference position on the stage, based on image data of the support plate; and
    a stage control portion that causes the stage to execute a first movement from an original position to a first position at a first velocity, and then execute a second move to a second position at a second velocity that is less than the first velocity, when the positional deviation of the support plate relative to the reference position is detected,
    wherein the first movement of the stage to the first position is in a direction corresponding to the positional deviation of the support plate.

2. The stage control device according to claim 1,
    wherein the position detection portion detects the positional deviation of the support plate relative to the reference position, from an image obtained by an image sensor through a scope, the image including the support plate and a sample mounted to the support plate.

3. The stage control device according to claim 1,
    wherein the position detection portion is configured to detect a positional deviation of the support plate relative to the reference position again after the stage control portion moves the support plate to the second position, and
    wherein, if a positional deviation of the support plate relative to the reference position is detected again, the stage control portion causes the stage to execute a third movement from the original position to a third position at a third velocity, and then execute a fourth movement to a fourth position at a fourth velocity that is less than the third velocity.

4. The stage control device according to claim 1,
    wherein the first velocity is based on an amount of the positional deviation of the support plate relative to the reference position, and the second velocity is independent of the amount of positional deviation of the support plate relative to the reference position.

5. The stage control device according to claim 1,
    wherein a distance from the original position to the first position is based on an amount of the positional deviation of the support plate relative to the reference position.

6. The stage control device according to claim 1,
    wherein stage includes at least one convex portion that has an upper surface including a taper shape.

7. The stage control device according to claim 1, wherein the second position is the original position.

8. A stage control method comprising:
    detecting a positional deviation of a support plate that is positioned on a stage, relative to a support plate reference position on the stage, based on image data of the support plate; and
    executing a first movement of the stage from an original position to a first position at a first velocity, and then executing a second move to a second position at a second velocity that is less than the first velocity, when the positional deviation of the support plate relative to the reference position is detected,
    wherein the first movement of the stage to the first position is in a direction corresponding to the positional deviation of the support plate.

9. The stage control method according to claim 8, wherein the second position is the original position.

10. A microscope comprising:
    an imaging element;
    a stage configured to hold a support plate with a sample disposed thereon the stage being movable in a surface direction of the support plate so that the sample may be moved within an imaging scope of the imaging element;
    a convex portion which is provided in the stage and regulates the support plate in a support plate reference position on the stage;
    a position detection portion configured to detect a positional deviation of the support plate that is positioned on the stage, relative to the support plate reference position, based on image data of the support plate received by the imaging element; and
    a stage control portion that causes the stage to execute a first movement from an original position to a first position at a first velocity, and then execute a second move to a second position at a second velocity that is less than the first velocity, when the positional deviation of the support plate relative to the reference position is detected, wherein the first movement of the stage to the first position is in a direction corresponding to the positional deviation of the support plate.

11. The microscope according to claim 10, wherein the second position is the original position.

* * * * *